United States Patent
Valkier et al.

(10) Patent No.: US 10,479,883 B2
(45) Date of Patent: Nov. 19, 2019

(54) COMPOSITIONS FOR AUTOMOTIVE INTERIOR PARTS

(71) Applicant: SABIC GLOBAL TECHNOLOGIES B.V., Bergen op Zoom (NL)

(72) Inventors: Pieter Valkier, Sittard (NL); Dimphna Johanna Maria van Beek, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 75 days.

(21) Appl. No.: 15/571,571

(22) PCT Filed: Apr. 29, 2016

(86) PCT No.: PCT/EP2016/059663
§ 371 (c)(1),
(2) Date: Nov. 3, 2017

(87) PCT Pub. No.: WO2016/177643
PCT Pub. Date: Nov. 10, 2016

(65) Prior Publication Data
US 2018/0155537 A1    Jun. 7, 2018

(30) Foreign Application Priority Data
May 5, 2015   (EP) .................................... 15166344

(51) Int. Cl.
*C08L 23/14*    (2006.01)
(52) U.S. Cl.
CPC ........... *C08L 23/14* (2013.01); *C08L 2205/02* (2013.01); *C08L 2205/03* (2013.01); *C08L 2205/035* (2013.01); *C08L 2207/02* (2013.01); *C08L 2207/04* (2013.01); *C08L 2207/062* (2013.01)
(58) Field of Classification Search
CPC ................. C08L 23/14; C08L 2205/02; C08L 2207/062; C08L 2205/035; C08L 2205/03; C08L 2207/04; C08L 2207/02
See application file for complete search history.

(56) References Cited

U.S. PATENT DOCUMENTS

| | | |
|---|---|---|
| 3,324,095 A | 6/1967 | Carrick et al. |
| 3,324,101 A | 6/1967 | Baker et al. |
| 3,642,749 A | 2/1972 | Johnson et al. |

FOREIGN PATENT DOCUMENTS

| | | |
|---|---|---|
| EP | 1 860 147 A1 * | 11/2007 |
| EP | 1860147 A1 | 11/2007 |
| WO | 2013026745 A1 | 2/2013 |
| WO | 2013068273 A1 | 5/2013 |
| WO | 2013068274 A1 | 5/2013 |

OTHER PUBLICATIONS

"Polypropylene", R. Lieberman et al., Kirk-Othmer Encyclopedia of Chemical Technology, Wiley, 2006.
Alt et al., "Bimodal Polyethylene—Interplay of Catalyst and Process," Macromol. Symp. 2001, 163, 135-143.
Cann et al., "Comparison of Silyl Chromate and Chromium Oxide Based Olefin Polymerization Catalysts," Macromol. Symp. 2004, 213, 29-36.
International Search Report for International Application No. PCT/EP2016/059663; International Filing Date: Apr. 29, 2016; dated Aug. 31, 2016; 5 Pages.
PE 100 Pipe Systems, second edition, Heiner Bromstrup (editor), 2004, pp. 16-20 ISBN 3-8027-2728-2.
Peacock, "Handbook of Polyethylene: Structures, Properties, and Applications," (2000) Marcel Dekker; pp. 43-66.
Polyethylene, High Density, E. Benham et al., Kirk-Othmer Encyclopedia of Chemical Technology, Wiley, 2005.
Written Opinion of the International Searching Authority for International Application No. PCT/EP2016/059663; International Filing Date: Apr. 29, 2016; dated Aug. 31, 2016; 6 Pages.

* cited by examiner

*Primary Examiner* — Robert D Harlan
(74) *Attorney, Agent, or Firm* — Cantor Colburn LLP

(57) ABSTRACT

The present invention relates to a composition comprising a heterophasic propylene copolymer and an ethylene polymer wherein the ethylene polymer has a density as measured according to ISO 1183-1 (2012), method A of ≥940 kg/m3, the ethylene polymer has a multimodal molecular weight distribution and the ethylene polymer has a strain hardening modulus of ≥5.0 MPa, the strain hardening modulus being measured according to ISO DIS 18488 (2014) using test specimens of 0.30 mm thickness. Such composition has a low surface gloss, while at least one of impact strength, scratch resistance and/or flexural modulus is improved. Such composition may for example be used in automotive interior parts.

17 Claims, No Drawings

COMPOSITIONS FOR AUTOMOTIVE INTERIOR PARTS

CROSS REFERENCE TO RELATED APPLICATIONS

This application is a 371 of International Application No. PCT/EP2016/059663, filed Apr. 29, 2016, which claims priority to European Application No. 15166344.0, filed May 5, 2015 which are incorporated herein by reference in their entirety.

The present invention relates to compositions comprising a heterophasic propylene copolymer. The invention further relates to the use of such compositions for the production of automotive interior parts, and to automotive interior parts produced using such compositions.

Compositions for automotive interior parts have for example been disclosed in WO2013068274A1. WO2013068274A1 presents compositions comprising a heterophasic polypropylene, a multimodal 1-butene based polyethylene and a filler. However, the compositions presented in this publication do not provide a desired balance of impact resistance, flexural modulus and low surface gloss properties.

WO2013068273A1 also presents compositions for automotive interior parts, striving for improvement of stiffness, impact resistance and low gloss. This is reportedly achieved by polyolefin compositions comprising a heterophasic polypropylene, a multimodal polyethylene having a density of 850 to 920 kg/m³ and a filler. However, these compositions also do not provide a desired balance of impact resistance, flexural modulus and low surface gloss properties.

Objects that are subjected to intensive use for a long duration, while maintaining a certain aesthetic appearance, such as automotive interior parts, desire to demonstrate a balance of material properties. Compositions that are suitable for use in production of such objects desire to demonstrate a certain balance of impact resistance, scratch resistance, flexural modulus, and low surface gloss.

In order to maintain its aesthetic look for the duration of use, automotive interior parts desirably have a certain scratch resistance. In the context of the present invention, the scratch resistance is expressed by scratch visibility. The scratch visibility is determined according to the method described below in the experimental section.

It is an object of the present invention to provide a composition having a low surface gloss, wherein at least one of impact strength, scratch resistance and/or flexural modulus is improved.

This objective is achieved according to the present invention by a composition comprising a heterophasic propylene copolymer and an ethylene polymer having a density as measured according to ISO 1183-1 (2012), method A of ≥925 kg/m³, preferably ≥940 kg/m³, wherein the ethylene polymer has a multimodal molecular weight distribution and the ethylene polymer has a strain hardening modulus of ≥5.0 MPa, the strain hardening modulus being measured according to ISO DIS 18488 (2014) using test specimens of 0.30 mm thickness.

ISO 1183-1 (2012) relates to methods for determining the density of non-cellular plastics. Method A thereof relates to such determination via immersion method.

ISO DIS 18488 (2014) relates to determination of strain hardening modulus of polyethylene materials.

Such composition has a low surface gloss, while at least one of impact strength, scratch resistance and/or flexural modulus is improved. Such composition may for example be used in automotive interior parts.

For example, the composition may comprise ≥50.0% by weight of heterophasic propylene copolymer, alternatively ≥60.0% by weight, alternatively ≥65.0% by weight compared to the total weight of the composition. For example, the composition may comprise ≤90.0% by weight of heterophasic propylene copolymer, alternatively ≤85.0% by weight of heterophasic propylene copolymer, alternatively ≤80.0% by weight, alternatively ≤75.0% by weight, alternatively ≤70.0% by weight compared to the total weight of the composition. For example, the composition may comprise ≥50.0% and ≤85.0% by weight of heterophasic propylene copolymer, alternatively ≥60.0% and ≤75.0% by weight compared to the total weight of the composition.

For example, the composition may comprise ≥2.0% by weight of ethylene polymer, alternatively ≥5.0% by weight, alternatively ≥8.0% by weight, compared to the total weight of the composition. For example, the composition may comprise ≤20.0% by weight of ethylene polymer, alternatively ≤15.0% by weight, alternatively ≤12.0% by weight, compared to the total weight of the composition. For example, the composition may comprise ≥2.0% and ≤20.0% by weight of ethylene polymer, alternatively ≥5.0% and ≤15.0% by weight, alternatively ≥8.0% and ≤12.0% by weight, compared to the total weight of the composition.

The heterophasic propylene copolymer may for example comprise a multi-phase structure. The multi-phase structure may for example be a two-phase structure. The multi-phase structure may for example comprise a matrix phase and at least one dispersed phase. In case the multi-phase structure is a two-phase structure, the multi-phase structure comprises a matrix phase and a dispersed phase. The matrix phase may comprise both crystalline segments and amorphous segments. The dispersed phase may comprise both crystalline segments and amorphous segments.

The matrix phase of the heterophasic propylene copolymer may for example be present in an amount of ≥50.0% by weight, alternatively for example in an amount of ≥60.0% by weight, alternatively in an amount of ≥70.0% by weight, alternatively in an amount of ≥80.0% by weight, compared to the total weight of the heterophasic propylene copolymer. The matrix phase of the heterophasic propylene copolymer may for example be present in an amount of ≤95.0% by weight, alternatively ≤90.0% by weight, alternatively ≤85.0% by weight, compared to the total weight of the heterophasic propylene copolymer. The matrix phase may be a continuous phase.

The matrix phase of the heterophasic propylene copolymer may for example comprise a propylene polymer such as a propylene homopolymer or a propylene-based copolymer.

The propylene-based copolymer may be a propylene-α-olefin copolymer. The propylene α-olefin copolymer may for example be a copolymer of propylene and an α-olefin comonomer. For example the propylene-α-olefin copolymer may comprise ≤20.0% by weight compared to the total weight of the propylene-α-olefin copolymer of monomeric units derived from an α-olefin comonomer. In an embodiment, the propylene-α-olefin copolymer may comprise ≤10.0% by weight compared to the total weight of the propylene-α-olefin copolymer of monomeric units derived from an α-olefin comonomer. In an embodiment, the propylene-α-olefin copolymer may comprise ≤5.0% by weight compared to the total weight of the propylene-α-olefin copolymer of monomeric units derived from an α-olefin comonomer. In an embodiment, the propylene-α-olefin copolymer may comprise for example ≥0.5% by weight, alternatively ≥1.0% by weight, alternatively ≥2.0% by weight compared to the total weight of the propylene-α-olefin copolymer of monomeric units derived from an α-olefin comonomer. The α-olefin comonomer may for example be selected from the groups of ethylene and/or α-olefins having ≥4 and ≤10 carbon atoms. In an embodiment, the α-olefin comonomer may for example be one or more selected from ethylene, 1-butene, 1-pentene, 4-methyl-1-pentene, 1-hexene, 1-heptene and/or 1-octene. Preferably, the α-olefin comonomer is ethylene.

In a preferred embodiment, the matrix phase of the heterophasic propylene copolymer comprises a propylene homopolymer.

The propylene polymer of the matrix phase of the heterophasic copolymer may for example have a melt mass flow rate as determined in accordance with ISO 1133-1 (2011), at a temperature of 230° C. and a load of 2.16 kg, of ≥10.0 g/10 min, alternatively ≥15.0 g/10 min, alternatively ≥20.0 g/10 min, alternatively ≥25.0 g/10 min. The propylene polymer of the matrix phase of the heterophasic copolymer may for example have a melt mass flow rate of ≤100 g/10 min, alternatively ≤90.0 g/10 min, alternatively ≤80.0 g/10 min, alternatively ≤70.0 g/10 min. In an embodiment, the propylene polymer of the matrix phase of the heterophasic copolymer may for example have a melt mass flow rate of ≥10.0 g/10 min and ≤100 g/10 min, alternatively ≥15.0 and ≤90.0 g/10 min, alternatively ≥20.0 and ≤80.0 g/10 min, alternatively ≥25.0 and ≤70.0 g/10 min. Use of a propylene polymer having such melt mass flow rate in the heterophasic propylene copolymer according to the present invention has an advantageous effect on processability, throughput and cycle time.

ISO 1133-1 (2011) relates to the determination of the melt mass flow rate and melt volume flow rate of thermoplastics.

The dispersed phase of the heterophasic propylene copolymer may for example comprise an elastomer. In the context of the present invention, elastomer means a material that can be stretched and upon release of stress returns to its original dimensions, and which can repeatedly do so. The elastomer comprised in the dispersed phase may for example be an ethylene-α-olefin elastomer, such as an ethylene-propylene elastomer.

The ethylene-α-olefin elastomer may for example comprise ≥10.0% by weight, alternatively ≥15.0% by weight, alternatively ≥20.0% by weight, alternatively ≥25.0% by weight, alternatively ≥30.0% by weight, of monomeric units derived from ethylene, compared to the total weight of the ethylene-α-olefin elastomer. The ethylene-α-olefin elastomer may for example comprise ≤65.0% by weight, alternatively ≤55.0% by weight, alternatively ≤45.0% by weight, alternatively ≤40.0% by weight, alternatively ≤35.0% by weight, alternatively ≤30.0% by weight, alternatively ≤25.0% by weight, alternatively ≤20.0% by weight, of monomeric units derived from ethylene, compared to the total weight of the ethylene-α-olefin elastomer.

In an embodiment, the ethylene-α-olefin elastomer may for example comprise ≥25.0% by weight and ≤45.0% by weight, for example ≥30.0% by weight and ≤40.0% by weight, of monomeric units derived from ethylene, compared to the total weight of the ethylene-α-olefin elastomer. Such amount of ethylene in the ethylene-α-olefin elastomer may contribute to a particularly high impact strength.

In an embodiment, the ethylene-α-olefin elastomer may for example comprise ≥10.0% by weight and ≤25.0% by weight, for example ≥15.0% by weight and ≤25.0% by weight, of monomeric units derived from ethylene, compared to the total weight of said ethylene-α-olefin elastomer. Such amount of ethylene in the ethylene-α-olefin elastomer may contribute to a particularly high scratch resistance.

The ethylene-α-olefin elastomer may for example comprise monomeric units derived from one or more α-olefin comonomers selected from the group of α-olefins having ≥3 and ≤8 carbon atoms. The one or more α-olefin comonomers selected from the group of α-olefins having ≥3 and ≤8 carbon atoms may for example be selected from propylene, 1-butene, 1-pentene, 4-methyl-1-pentene, 1-hexene, 1-heptene and 1-octene. In a preferred embodiment, the one or more α-olefin comonomers selected from the group of α-olefins having ≥3 and ≤8 carbon atoms is one or more selected from selected from the group of α-olefins having ≥3 and ≤4 carbon atoms. Preferably, the one or more α-olefin comonomers selected from the group of α-olefins having ≥3 and ≤8 carbon atoms is propylene.

The ethylene-α-olefin elastomer may for example may for example have a melt mass flow rate as determined in accordance with ISO 1133-1 (2011), at a temperature of 230° C. and a load of 2.16 kg, of ≥0.10 g/10 min, alternatively ≥0.20 g/10 min, alternatively ≥0.30 g/10 min. The ethylene-α-olefin elastomer may for example have a melt mass flow rate of ≤2.00 g/10 min, alternatively ≤1.80 g/10 min, alternatively ≤1.50 g/10 min, alternatively ≤1.30 g/10 min. In an embodiment, the ethylene-α-olefin elastomer may for example have a melt mass flow rate of ≥0.10 g/10 min and ≤2.00 g/10 min, alternatively ≥0.20 and ≤1.80 g/10 min, alternatively ≥0.30 and ≤1.50 g/10 min.

The dispersed phase may for example be present in an amount of ≥5.0% by weight, alternatively in an amount of ≥10.0% by weight, alternatively in an amount of ≥15.0% by weight, alternatively in an amount of ≥20.0% by weight, alternatively in an amount of ≥30.0% by weight, compared to the total weight of the heterophasic propylene copolymer. The dispersed phase may for example be present in an amount of ≤40.0% by weight, alternatively in an amount of ≤35.0% by weight, compared to the total weight of the heterophasic propylene copolymer. Such amount of disperse phase may contribute to a particularly desirable impact strength and low shrinkage.

The fractions of matrix phase and dispersed phase of the heterophasic propylene copolymer may for example be determined via nuclear magnetic resonance spectroscopy (NMR) which is well known in the art. Other methods for determination thereof known in the art may also be used.

The heterophasic propylene copolymer may for example have a melt mass flow rate as determined in accordance with ISO 1133-1 (2011), at a temperature of 230° C. and a load of 2.16 kg, of ≥10.0 g/10 min, alternatively ≥15.0 g/10 min, alternatively ≥20.0 g/10 min, alternatively ≥25.0 g/10 min, alternatively ≥30.0 g/10 min., and of ≤70.0 g/10 min, alternatively ≥50.0 g/10 min, alternatively ≥40.0 g/10 min. In an embodiment, the heterophasic propylene copolymer has a melt mass flow rate of ≥20.0 g/10 min and ≥50.0 g/10 min, alternatively ≥30.0 g/10 min and ≥40.0 g/10 min.

The heterophasic propylene copolymer may for example be prepared in one or more polymerization reactors, such as for example by polymerization of propylene in the presence of a catalyst system and subsequent polymerization of a propylene-α-olefin mixture. The resulting polymeric materials are heterophasic, but the specific morphology usually depends on the preparation method and the monomer ratios used.

The heterophasic propylene copolymer used in the composition of the present invention can be produced using any conventional process known to the skilled person, for example multistage process polymerization, such as bulk polymerization, gas phase polymerization, slurry polymerization, solution polymerization or any combinations thereof. Any conventional catalyst system for the production of heterophasic propylene copolymers may be used, such as for example Ziegler-Natta catalyst systems or metallocene catalyst systems. Such processes and catalyst systems are for example described in "Polypropylene", R. Lieberman et al., Kirk-Othmer Encyclopedia of Chemical Technology, Wiley, 2006.

The heterophasic propylene copolymer that may be used in the compositions according to the present invention may for example be produced in a process comprising preparing a propylene polymer in a first reactor in the presence of a catalyst system and in a second reactor reacting the propylene polymer obtained from the first reactor with monomeric reactants comprising ethylene and propylene in the presence of a catalyst system to obtain the heterophasic propylene copolymer comprising an ethylene-α-olefin elastomer fraction.

Optionally, the heterophasic propylene copolymer may be subjected to processing in the presence of organic peroxides and/or polyfunctional monomers. Such processing results in a change of the molecular chain length, resulting in a change of the melt mass flow rate of the heterophasic propylene copolymer. Such processing may for example be done by melt mixing, for example by melt mixing in a melt extruder. Melt mixing as used in the context of the present invention means mixing at a temperature that exceeds the melting point of the heterophasic propylene copolymer. Melt mixing may for example be performed at a temperature in the range of 150–300° C. In case a melt extruder is used for melt mixing, for example a twin screw extruder may be used. The temperature may for example vary along the different zones of the extruder. For example, the temperature may vary from 180° C. in the feed zone to 300° C. at the outlet of the extruder. In an embodiment, the temperature in the extruder varies from 200° C. to 265° C.

Organic peroxides that are suitable for use according to the present invention are well known in the art and may include for example dialkyl peroxides such as for example dicumyl peroxides, peroxyketals, peroxycarbonates, diacyl peroxides, peroxyesters and peroxydicarbonates. Examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxy-isopropyl)benzene, lauroyl peroxide, tert-butyl peracetate, α,α'-bis(tert-butylperoxy)diisopropylbenzene, 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate.

The amount of organic peroxide that may be used may for example be up to 0.50 wt %, alternatively up to 0.40 wt %, alternatively up to 0.15 wt %, for example in the range of 0.02 to 0.50 wt %, alternatively in the range of 0.05 to 0.25 wt %, compared to the weight of the heterophasic propylene copolymer.

Polyfunctional monomers that are suitable for use according to the present invention may for example include polyfunctional acrylates. For example, such polyfunctional acrylates conprise two or more unsaturated groups capable of undergoing radical addition. For example, such polyfunctional acrylate may be one or more selected from di- and tri-(meth)acrylates, such as 1,4-butanediol-dimethacrylate (BDDMA), 1,6-hexanediol-dimethacrylate (HDDMA), 1,3-butyleneglycol-dimethacrylate (BGDMA), ethyleneglycol-dimethacrylate (EGDMA), dodecanediol-dimethacrylate (DDDMA), trimethylolpropane-trimethacrylate (TMPTMA) and trimethacrylate ester (TMA ester).

The amount of polyfunctional monomers that may be used may for example be up to 1.00 wt %, alternatively up to 0.50 wt %, alternatively up to 0.30 wt %, for example in the range of 0.02-0.50 wt %, alternatively 0.05-0.30 wt %, compared to the total weight of the heterophasic propylene copolymer.

The ethylene polymer may for example be a polymer obtained by polymerizing ethylene as monomer, optionally in the presence of one or more comonomers, in a slurry polymerization process, a gas phase polymerization process or a solution polymerization process. The slurry, gas phase or solution polymerization processes may be catalytic polymerization processes. Such catalytic polymerization processes are commonly operated at reaction pressures of up to for example 2.0 MPa, alternatively up to for example 1.0 MPa, and at pressures of at least for example 0.3 MPa, alternatively at least 0.5 MPa, for example in the range of 0.3 MPa to 1.0 MPa, alternatively for examples in the range of 0.5 MPa to 1.0 MPa. Such catalytic polymerization processes may be operated at reaction temperatures of for example at most 90° C., alternatively for example at most 85° C., and of for example at least 70° C., alternatively for example at least 75° C., in the range of for example 70° C. to 90° C., alternatively in the range of for example 75° C. to 85° C. Optionally, chain terminating agent may be added to the polymerization reaction. Such chain terminating agent may for example be hydrogen.

The catalytic polymerization processes may be operated using for example Ziegler-Natta catalyst systems, chromium-based Phillips type catalyst systems, metallocene catalysts systems, or any other catalyst system known in the art of ethylene polymer production. Such catalyst systems and polymerization processes are for example described in Polyethylene, High Density, E. Benham et al., Kirk-Othmer Encyclopedia of Chemical Technology, Wiley, 2005. The selection and concentration of catalyst, system, comonomer and molecular weight controlling agent have for example an effect on the characteristics of the ethylene polymer.

The ethylene polymer may for example be produced using a multi-stage polymerization process. Such multi-stage polymerization process may comprise for example two, three of more reactors in operated in series. The reactors may for example be stirred reactors, loop reactors or any other type of reactors known in the art of ethylene polymer production via catalytic polymerization processes. The multi-stage polymerization process may comprise multiple reactors of a single reactor type or may comprise combinations of reactors of different types. The operating conditions of each reactor may be the same or different as the operating conditions of the other reactors together forming the multi-stage polymerization process.

The ethylene polymer may be produced using ethylene as the sole monomer, or may be produced using ethylene and one or more α-olefin comonomers. In case the ethylene polymer is produced using ethylene as the sole monomer, the ethylene polymer is an ethylene homopolymer. In case the ethylene polymer is produced using ethylene and one or more α-olefin comonomers, the ethylene polymer is an ethylene copolymer.

The production processes of LDPE, HDPE and LLDPE are summarised in "Handbook of Polyethylene" by Andrew Peacock (2000; Dekker; ISBN 0824795466) at pages 43-66. The catalysts can be divided in three different subclasses including Ziegler Natta catalysts, Phillips catalysts and single site catalysts. The various processes may be divided into solution polymerisation processes employing homogeneous (soluble) catalysts and processes employing supported (heterogeneous) catalysts. The latter processes include both slurry and gas phase processes.

The polymerisation of ethylene with supported chromium based catalysts is disclosed by Kevin Cann in "Comparison of silyl chromate and chromium oxide based olefin polymerisation catalysts" (Macromolecular Symp, 2004, 213, 29-36). This publication elucidates that there is a clear difference between chromium oxide based catalysts (Philips catalysts) and silylchromate based catalysts. The silylchromate catalyst consists of silylchromate (bis-triphenylsilyl chromate) absorbed on dehydrated silica and subsequently reduced with for example diethylaluminum ethoxide. The use of silyl chromate as a polymerization catalyst for olefin polymerization is disclosed in for example U.S. Pat. Nos. 3,324,095, 3,324,101 and 3,642,749. Although similar in structure the oxo and triphenylsilyl chromate catalyst perform very differently in polymerisation reactions. Silylchromate-based catalysts generally produce desirable polyethylenes relative to those produced by chromium oxide-type catalysts. Silylchromate produced polyethylenes generally have a broader molecular weight distribution than those produced using chromium oxide-type catalysts. The broader molecular weight distribution leads to better processability of the resulting polyethylene whereas the productivity of polymerisations (gPE/g catalyst) with silylchromate-based catalysts is relatively low in comparison with chromium oxide-based catalysts.

The production processes for bimodal high density polyethylene (HDPE) are summarised at pages 16-20 of "PE 100 Pipe systems" (edited by Brömstrup; second edition, ISBN 3-8027-2728-2).

The production of bimodal high density polyethylene (HDPE) via a low pressure slurry process is described by Alt et al. in "Bimodal polyethylene-Interplay of catalyst and process" (Macromol. Symp. 2001, 163, 135-143). In a two stage cascade process the reactors may be fed continuously with a mixture of monomers, hydrogen, catalyst/co-catalyst and diluent recycled from the process. In the reactors, polymerisation of ethylene occurs as an exothermic reaction at pressures in the range between for example 0.2 MPa (2 bar) and 1 MPa (10 bar) and at temperatures in the range between for example 75° C. and 85° C. The heat from the polymerisation reaction is removed by means of external cooling. The characteristics of the polyethylene are determined amongst others by the catalyst system and by the concentrations of catalyst, co monomer and hydrogen.

The concept of the two stage cascade process is elucidated at pages 137-138 by Alt et al. "Bimodal polyethylene-Interplay of catalyst and process" (Macromol. Symp. 2001, 163).

The reactors are set up in cascade with different conditions in each reactor including for example a high hydrogen content in the first reactor and a low hydrogen content in the second reactor. This allows for the production of HDPE with a bimodal molecular mass distribution and desired co monomer content in the polyethylene chains. For reasons of monomer efficiency, it is common practise that the polymer suspension or "slurry" obtained after the second reactor flows into a so-called post reactor. In this reactor the final polymerisation takes place, resulting in a conversion rate of more than 99% of the monomers used. The suspension then flows to a suspension receiver and the suspension leaving the receiver is separated, for example via a decanter centrifuge. The resulting wet polymer is fed to a fluidised bed dryer and the liquid part goes back to the reactors. After drying the extrusion step takes place. The solvent coming from the drying of the polymer is recycled after purification by amongst other distillation.

The one or more α-olefin comonomers may for example be one or more selected from the group of α-olefins having ≥3 and ≤10 carbon atoms. Preferably the one or more α-olefin comonomers comprises an acyclic α-olefin. For example, the one or more α-olefin comonomers may be one or more selected from 1-butene, 1-pentene, 4-methyl-1-pentene, 1-hexene, 1-heptene and/or 1-octene. For example, the one or more α-olefin comonomers may comprise 1-butene.

In case the ethylene polymer is an ethylene copolymer, the one or more α-olefin comonomers may be present in an amount of for example at most 2.0% by weight compared to the total weight of the monomers. Alternatively the one or more α-olefin comonomers may be present in an amount of for example at most 1.5% by weight compared to the total weight of the monomers. The one or more α-olefin comonomers may be present in an amount of for example at least 0.1% by weight compared to the total weight of the monomers. Alternatively, the one or more α-olefin comonomers may be present in an amount of for example at least 0.2% by weight compared to the total weight of the monomers. Preferably, the one or more α-olefin comonomers may be present in an amount of at least 0.2 and at most 1.5% by weight compared to the total weight of the monomers.

In an embodiment, the ethylene polymer may have a density as measured according to ISO 1183-1 (2012), method A of ≥925 kg/m$^3$, alternatively ≥935 kg/m$^3$, alternatively ≥940 kg/m$^3$ (HDPE, high density polyethylene), alternatively ≥945 kg/m$^3$. In an embodiment, the ethylene polymer may have a density of ≤970 kg/m$^3$, alternatively ≤965 kg/m$^3$, alternatively ≤960 kg/m$^3$, alternatively ≤955 kg/m$^3$. In an embodiment, the ethylene polymer may have a density of ≥935 kg/m$^3$ and ≤965 kg/m$^3$, alternatively ≥945 kg/m$^3$ and ≤955 kg/m$^3$. Such density range of the ethylene polymer may for example contribute to a high scratch resistance.

The ethylene polymer may have a multimodal molecular weight distribution. An ethylene polymer having a multimodal molecular weight distribution may for example have a distribution representing the number of polymer molecules having a given molecular weight comprising at least two modes.

Such ethylene polymer having a multimodal molecular weight distribution may for example be obtained by producing the ethylene polymer in a polymerisation process that comprises more than one reaction step. A reaction step is defined as a part of the polymerization reaction in which the operating conditions may be controlled independently from other parts. For example, such reaction step may comprise a reactor. For example, such polymerization processes comprising more than one reaction step may comprise multiple reactors in operating in series. Operating conditions that may for example be controlled individually per reaction step are catalyst feed, comonomer feed, pressure, temperature, reaction time, and chain terminating agent feed.

Such ethylene polymer having a multimodal molecular weight distribution may for example be obtained by mixing at least two ethylene polymers having a unimodal molecular weight distribution.

For example, such ethylene polymer having a multimodal molecular weight distribution may have a non-uniform distribution of the fraction of comonomer build-in into the polymer molecules having different molecular weight. For example, the ethylene polymer having a multimodal molecular weight distribution may have a higher fraction of comonomer built into the polymer molecules having a higher molecular weight compared to the fraction of comonomer built into the polymer molecules having a lower molecular weight. For example, the ethylene polymer having a multimodal molecular weight distribution may have a higher fraction of comonomer built into the polymer molecules having a lower molecular weight compared to the fraction of comonomer built into the polymer molecules having a higher molecular weight.

The strain hardening modulus in the context of the present invention is used as an indicator for resistance to slow crack growth. Resistance to slow crack growth is related to the lifetime of ethylene polymers. The strain hardening modulus may be considered as a measure for the disentanglement capability of tie molecules in ethylene polymers. Tie molecules are those molecules that via physical entanglement form intermolecular interactions that for example contribute to the mechanical strength of an ethylene polymer. The strain hardening modulus is determined according to the method described in ISO DIS 18488 (2014), using test specimens of 0.30 mm thickness.

In an embodiment, the present invention relates to a composition wherein the heterophasic propylene copolymer has a xylene soluble fraction as determined according to ISO 16152 (2005) of ≥5.0% and ≤27.0% by weight compared to the total weight of the heterophasic propylene copolymer.

ISO 16152 (2005) relates to the determination of xylene-soluble matter in polypropylene.

In the context of the present invention, the xylene soluble fraction of the heterophasic propylene copolymer means the percentage by weight of the heterophasic propylene copolymer that does not precipitate out when a solution of the heterophasic propylene copolymer in xylene is cooled from reflux temperature to 25° C. and held at that temperature for a period of time as specified in ISO 16152 (2005).

For example, the heterophasic propylene copolymer may have a xylene soluble fraction of ≥5.0% by weight, alternatively ≥10.0% by weight, compared to the total weight of the heterophasic propylene copolymer. For example, the heterophasic propylene copolymer may have a xylene soluble fraction of ≤27.0% by weight, alternatively ≤20.0% by weight, alternatively ≤16.0% by weight, compared to the total weight of the heterophasic propylene copolymer. For example, the heterophasic propylene copolymer may have a xylene soluble fraction of ≥5.0% and ≤27.0% by weight, alternatively ≥10.0% and ≤16.0% by weight, compared to the total weight of the heterophasic propylene copolymer.

In another embodiment, the present invention relates to a composition wherein the xylene soluble fraction of the heterophasic propylene copolymer as obtained according to the method described in ISO 16152 (2005) has an intrinsic viscosity as determined according to ISO 1628-3 (2010) of at least 200 ml/g.

ISO 1628-3 (2010) relates to determination of the viscosity of polymers in dilute solution using capillary viscometers. The intrinsic viscosity is determined using a k value of 0.27.

The xylene soluble fraction of the heterophasic propylene copolymer may for example have an intrinsic viscosity of ≥200 ml/g, alternatively ≥300 ml/g, alternatively ≥400 ml/g.

In another embodiment, the present invention relates to a composition wherein the composition comprises one or more inorganic fillers in an amount of ≥2.0 and ≤20.0% by weight compared to the total weight of the composition.

Suitable inorganic fillers may be one or more selected from silicate minerals such as for examples inosilicates or phyllosilicates. For example, such inosilicate may be wollastonite. For example, such phyllosilicate may be mica or a clay. For example, such clay may be montmorrillonite, kaolinite or talc. In an embodiment, the one or more inorganic filler comprises at least one of talc. The one or more inorganic filler may comprise a blend of two or more different types of talc.

For example, the composition according to the present invention may comprise ≥1.0% by weight, alternatively ≥2.0% by weight, alternatively ≥5.0% by weight of inorganic filler, compared to the total weight of the composition. For example, the composition may comprise ≤25.0% by weight, alternatively ≤20.0% by weight, alternatively ≤15.0% by weight of inorganic filler, compared to the total weight of the composition. For example, the composition may comprise ≥2.0% and ≤25.0% by weight, alternatively ≥5.0 and ≤15.0% by weight of inorganic filler, compared to the total weight of the composition.

In an embodiment, the present invention relates to a composition wherein the one or more inorganic fillers is selected from the group of talcs.

In another embodiment, the present invention relates to a composition wherein the median Stokes equivalent spherical diameter of the talc particles is ≤1.0 μm as determined according to ISO 13317-3 (2001).

The median Stokes equivalent spherical diameter of the talc particles, also referred to as the median Stokes diameter, is determined in accordance with ISO 13317-3 (2001). ISO 13317-3 (2001) relates to particle size distribution determination via gravitational liquid sedimentation methods.

For example, the talc may have a median Stokes diameter as determined according to ISO 13317-3 (2001) of ≤10.0 μm, alternatively ≤5.0 μm, alternatively ≤3.0 μm, alternatively ≤2.0 μm, alternatively ≤1.0 μm. For example, the talc may have a median Stokes diameter as determined according to ISO 13317-3 (2001) of ≥0.1 μm, alternatively ≥0.2 μm, alternatively ≥0.5 μm. For example, the talc may have a median Stokes diameter as determined according to ISO 13317-3 (2001) of 0.1 and ≤1.0 μm.

In an embodiment, the present invention relates to a composition wherein the composition comprises at least one thermoplastic elastomer.

In another embodiment, the present invention relates to a composition wherein the at least one thermoplastic elastomer is present in an amount of ≥2.0 and ≤20.0% by weight compared to the total weight of the composition.

In another embodiment, the present invention relates to a composition wherein the at least one thermoplastic elastomer comprises a thermoplastic polyolefin elastomer.

In the context of the present invention, thermoplastic elastomers are defined as thermoplastic materials that can be stretched and upon release of stress returns to its original dimensions, and which can repeatedly do so. Examples of such thermoplastic elastomers include but are not limited to thermoplastic polyurethane elastomers, thermoplastic copolyester elastomers, thermoplastic polyamide elastomers, thermoplastic polyolefin elastomers, and styrene block copolymer elastomers. Such thermoplastic polyolefin elastomers may for example be ethylene-based elastomers.

The ethylene-based elastomer may for example comprise ≥10.0% by weight, alternatively ≥15.0% by weight, alternatively ≥20.0% by weight, alternatively ≥25.0% by weight, alternatively ≥30.0% by weight, of monomeric units derived from ethylene, compared to the total weight of the ethylene-based elastomer. The ethylene-based elastomer may for example comprise ≤45.0% by weight, alternatively ≤40.0% by weight, alternatively ≤35.0% by weight, alternatively ≤30.0% by weight, alternatively ≤25.0% by weight, alternatively ≤20.0% by weight, of monomeric units derived from ethylene, compared to the total weight of the ethylene-based elastomer.

In a preferred embodiment, the ethylene-based elastomer may for example comprise ≥25.0% by weight and ≤45.0% by weight, for example ≥30.0% by weight and ≤40.0% by weight, of monomeric units derived from ethylene, compared to the total weight of the ethylene-based elastomer. Such amount of ethylene in the ethylene-based elastomer may contribute to a particularly high impact strength.

In a preferred embodiment, the ethylene-based elastomer may for example comprise ≥10.0% by weight and ≤25.0% by weight, for example ≥15.0% by weight and ≤25.0% by weight, of monomeric units derived from ethylene, compared to the total weight of said ethylene-based elastomer. Such amount of ethylene in the ethylene-based elastomer may contribute to a particularly high scratch resistance.

The ethylene-based elastomer may for example comprise monomeric units derived from one or more α-olefin comonomers selected from the group of α-olefins having ≥3 and ≤8 carbon atoms. The one or more α-olefin comonomers selected from the group of α-olefins having ≥3 and ≤8 carbon atoms may for example be selected from propylene, 1-butene, 1-pentene, 4-methyl-1-pentene, 1-hexene, 1-heptene and 1-octene. In an embodiment, the one or more α-olefin comonomers selected from the group of α-olefins having ≥3 and ≤8 carbon atoms may for example be selected from propylene, 1-butene and 1-octene.

The ethylene-based elastomer may for example be an ethylene/1-butene elastomer. The ethylene-based elastomer may for example be an ethylene/1-octene elastomer.

In an embodiment, the present invention relates to a composition wherein the ethylene polymer has a molecular weight distribution as determined according to ASTM D-6474 (2012) of ≥10.0 and ≤40.0.

The ethylene polymer may for example have a molecular weight distribution, also referred to as MWD, as determined according to ASTM D-6474 (2012) of ≥10.0, alternatively ≥15.0, alternatively ≥20.0. The ethylene polymer may for example have an MWD of ≤40.0, alternatively ≤35.0, alternatively ≤30.0, alternatively ≤25.0. The ethylene polymer may for example have an MWD≥10.0 and ≤40.0, alternatively ≥15.0 and ≤35.0, alternatively ≥20.0 and ≤30.0. Said MWD is defined as the ratio between the weight average molecular weight $M_w$ and the number average molecular weight $M_n$, ($M_w/M_n$) as determined according to ASTM D-6474 (2012).

In an embodiment, the present invention relates to a composition wherein the composition has:
  an Izod impact strength measured according to ISO 180/A (2000) at a temperature of 0° C. of ≥8.5 kJ/m$^2$;
  an Izod impact strength measured according to ISO 180/A (2000) at a temperature of −30° C. of ≥4.0 kJ/m$^2$;
  an Izod impact strength measured according to ISO 180/A (2000) at a temperature of 23° C. of ≥30.0 kJ/m$^2$; and
  a gloss value as measured according to ISO2813 (2014) at an angle of 20° of ≤30.0 GU.

In the context of the present invention, impact resistance is expressed by Izod impact strength, measured in accordance with ISO 180 (2000), method A. ISO 180 (2000) relates to determination of Izod impact strength. The Izod impact strength is measured at temperatures of −30° C., 0° C. and 23° C. A certain impact resistance allows for the production of automotive interior parts that are able to withstand impacts to which such parts are commonly subjected as a result of normal use of the part when mounted.

The Izod impact strength measured according to ISO 180/A (2000) at a temperature of 0° C. of the composition may for example be ≥8.5 kJ/m$^2$, alternatively ≥9.0 kJ/m$^2$, alternatively ≥9.5 kJ/m$^2$, alternatively ≥10.0 kJ/m$^2$. The Izod impact strength measured according to ISO 180/A (2000) at a temperature of −30° C. of the composition may for example be ≥4.0 kJ/m$^2$, alternatively ≥4.50 kJ/m$^2$, alternatively ≥5.0 kJ/m$^2$. The Izod impact strength measured according to ISO 180/A (2000) at a temperature of 23° C. of the composition may for example be ≥30.0 kJ/m$^2$, alternatively ≥33.0 kJ/m$^2$, alternatively ≥35.0 kJ/m$^2$.

In the context of the present invention, surface gloss is expressed by the gloss value measured in accordance with ISO 2813 (2014). ISO 2813 (2014) relates to determination of gloss values. The gloss value presents the ratio of the luminous flux reflected from a specimen surface at a specified angle to the luminous flux reflected from a standardized glass surface as specified by ISO 2813 (2014) multiplied by 100. A low gloss is required for certain applications in automotive interiors, where a look and feel with certain similarity to natural leather is desired.

The gloss value of the composition as measured according to ISO2813 (2014) at an angle of 20° may for example be ≤30.0 GU, alternatively ≤25.0 GU, alternatively ≤20.0 GU.

In another embodiment, the present invention relates to a composition wherein the flexural modulus as measured according to ISO 178 (2010) method A is ≥1400 MPa.

ISO 178 (2010) relates to determination of flexural properties of plastics.

In the context of the present invention, the flexural modulus is the ratio of stress to strain in flexural deformation. The flexural modulus reflects the tendency for a material to bend.

In another embodiment, the present invention relates to the use of a composition for the production of automotive interior parts.

In the context of the present invention, automotive interior parts are to be understood to be shaped objects used in interiors of vehicles such as for example cars, trucks, tractors, and/or buses, that are subjected to touching by passengers during common use of the vehicle.

Automotive interior parts according to the present invention may have a structural function, which is to be understood as that such parts provide a strength to an object which they form part of and/or provide a strength for a function to be operated. Examples of automotive interior parts are dashboard parts, cover panels for storage compartments such as glove compartments, interior panels of passenger doors and trunk doors, control knobs and switches, center console parts, arm rests, roofing parts, steering wheel covers, steering column covers, instrument panel housings, seat backs, seat trims, pillar trims, roof liner panels, pedals, gear levers, trunk floor cover panels, air-bag covers.

In another embodiment, the present invention relates to an article, preferably an automotive interior part produced using a composition.

In an embodiment, the present invention relates to an automotive interior part comprising a composition having:
  a flexural modulus as measured according to ISO 178 (2010) method A of ≥1700 MPa;
  an Izod impact strength measured according to ISO 180/A (2000) at a temperature of 23° C. of ≥45.0 kJ/m$^2$;
  an Izod impact strength measured according to ISO 180/A (2000) at a temperature of −30° C. of ≥6.0 kJ/m$^2$; and
  a fraction of samples showing an impact failure in one of the categories YD or YS upon puncture impact testing according to ISO 6603-2 (2000) at 23° C. of ≥98%; and a fraction of samples showing an impact failure in one of the categories YD or YS upon puncture impact testing according to ISO 6603-2 (2000) at −30° C. of ≥80%.

Such automotive interior parts may for example comprise a composition comprising a heterophasic propylene copolymer and an ethylene polymer having a density as measured according to ISO 1183-1 (2012), method A of ≥925 kg/m³, preferably ≥940 kg/m³, wherein the ethylene polymer has a multimodal molecular weight distribution and the ethylene polymer has a strain hardening modulus of ≥5.0 MPa, the strain hardening modulus being measured according to ISO DIS 18488 (2014) using test specimens of 0.30 mm thickness.

The fraction of samples showing an impact failure in one of the categories YD or YS upon puncture impact testing is to be understood to be the number of samples showing an impact failure in one of the categories YD or YS upon impact testing according to ISO 6603-2 (2000) divided by the total number of samples subjected to testing, multiplied by 100%. Impact failure of categories YD or YS represent ductile failures. Ductile failure upon puncture impact is desirable in for example various automotive interior parts. For example, ductile failure upon puncture impact testing is desirable for air-bag covers. In such case, the rupture of the air-bag cover on deployment does not lead to passengers being exposed to sharp fragments or edges of the air-bag cover, resulting in a reduction of chance of injury resulting from exposure to the air-bag cover on impact.

ISO 6603-2 (2000) relates to the determination of puncture impact behaviour of rigid plastics.

The composition according to the present invention may further comprise additives that are commonly used in the production of compositions for automotive interior parts. Examples of such additives include nucleating agents, stabilisers, colorants, clarifiers, surface tension modifiers, lubricants, flame retardants, mould release agents, flow improving agents, plasticizers, antistatic agents, blowing agents, interfacial bond modifiers. Such stabilisers for example include heat stabilisers, antioxidants and/or UV stabilisers. Such colorants for example include pigments and/or dyes. Such colorants may for example be used in the form of masterbatches of such colorants in polymer carriers. Such interfacial bond modifiers may for example include maleated polypropylene. For example, the composition may comprise ≤5.0% by weight, alternatively ≤4.0% by weight, alternatively ≤3.0% by weight of additives, compared to the total weight of the composition.

In the context of the present invention, the weight % of an ingredient is defined as the fraction of the particular material in question that is made up for by the particular ingredient multiplied by 100, where the total of the material is 100 weight %.

The invention will now be illustrated by the following non-limiting examples.

In a 25 mm twin screw melt extruder, operated at a temperature of 210° C. at a speed of 250 RPM, compositions were prepared using the ingredients as listed in table 1. Table 1 presents the compositions used in examples 1-3 in accordance with the present invention and comparative examples 4-6

TABLE 1

| Example | 1 | 2 | 3 | 4 | 5 | 6 |
| --- | --- | --- | --- | --- | --- | --- |
| PP-1 | 67.4 | 67.4 |  | 67.4 | 67.4 |  |
| PP-2 |  |  | 67.4 |  |  | 67.4 |
| HDPE-1 |  |  |  | 10.0 |  |  |
| HDPE-2 | 10.0 |  |  |  | 15.0 |  |
| HDPE-3 |  | 10.0 | 10.0 |  |  |  |
| LDPE |  |  |  |  |  | 10.0 |
| TPE | 10.0 | 10.0 | 10.0 | 10.0 | 5.0 | 10.0 |
| Talc | 10.0 | 10.0 | 10.0 | 10.0 | 10.0 | 10.0 |
| Additive package | 2.6 | 2.6 | 2.6 | 2.6 | 2.6 | 2.6 |

The values in table 1 present weight fractions in % of the total weight of the composition.

The PP-1 that was used in the presented examples was a commercial polypropylene 612MK10, obtainable from SABIC, having a melt mass flow rate as measured according to ISO 1133-1 (2011) at a temperature of 230° C. and a load of 2.16 kg of 33.0 g/10 min.

The PP-2 that was used in the presented examples was a blend of 50 parts by weight of a commercial polypropylene 513MNK10, obtainable from SABIC, having a melt mass flow rate as measured according to ISO 1133-1 (2011) at a temperature of 230° C. and a load of 2.16 kg of 67.0 g/10 min., and 50 parts by weight of a commercial polypropylene 48M10, obtainable from SABIC, having a melt mass flow rate as measured according to ISO 1133-1 (2011) at a temperature of 230° C. and a load of 2.16 kg of 14.5 g/10 min.

As HDPE-1, a monomodal high-density polyethylene was used having the following properties:
melt mass flow rate as measured according to ISO 1133-1 (2011) at a temperature of 190° C. and a load of 2.16 kg of 8.28 g/10 min
density as measured according to ISO 1183-1 (2012), method A of 964 kg/m³
strain hardening modulus as measured according to ISO DIS 18488 (2014) at test specimens of 0.30 mm thickness of 2.8 MPa
MWD as measured according to ASTM D-6474 (2012) of 5.0.

As HDPE-2, a multimodal high-density polyethylene was used having the following properties:
melt mass flow rate as measured according to ISO 1133-1 (2011) at a temperature of 190° C. and a load of 2.16 kg of 0.30 g/10 min
density as measured according to ISO 1183-1 (2012), method A of 959 kg/m³
strain hardening modulus as measured according to ISO DIS 18488 (2014) at test specimens of 0.30 mm thickness of 15.0 MPa
MWD as measured according to ASTM D-6474 (2012) of 25.

As HDPE-3, a multimodal high-density polyethylene was used having the following properties:
melt mass flow rate as measured according to ISO 1133-1 (2011) at a temperature of 190° C. and a load of 2.16 kg of 1.70 g/10 min
density as measured according to ISO 1183-1 (2012), method A of 953 kg/m³
strain hardening modulus as measured according to ISO DIS 18488 (2014) at test specimens of 0.30 mm thickness of 13.1 MPa
MWD as measured according to ASTM D-6474 (2012) of 13.

The LDPE that was used in the presented examples was a commercial low density polyethylene 2402TH32W, obtainable from SABIC, having a melt mass flow rate as measured according to ISO 1133-1 (2011) at a temperature of 230° C. and a load of 2.16 kg of 2.50 g/10 min, and a density as measured according to ISO 1183-1 (2012), method A of 924 kg/m$^3$.

As TPE, Tafmer DF740 was used, a thermoplastic polyethylene elastomer obtainable from Mitsui Chemicals having a density of 870 kg/m$^3$, and a melt mass flow rate as measured according to ISO 1133-1 (2011) at a temperature of 190° C. and a load of 2.16 kg of 3.60 g/10 min.

As talc, HTP Ultra 5C was used, a talc having an median Stokes equivalent particle diameter of 0.65 μm, obtainable from Imi Fabi.

The composition of the additive package comprised:
16% by weight of oleamide (9-Octadecenamide), CAS registry nr. 301-02-0.
8% by weight of Irganox B225, obtainable from BASF, which is a mixture of 50% by weight of Irgafos 168 (tris (2,4-di-tert-butyl phenyl) phosphite), CAS registry nr. 31570-04-4 and 50% by weight of Irganox 1010 (pentaerythritol 4-hydroxy-3,5-di-tert-butylphenylpropionate), CAS registry nr. 6683-19-8.
76% by weight of a polyethylene-based color masterbatch.

In table 2, the material properties of the materials of examples 1-3 according to the present invention and comparative examples 4-6 are presented.

| Material parameter | Test method | Unit | 1 | 2 | 3 | 4 | 5 | 6 |
|---|---|---|---|---|---|---|---|---|
| Izod at 23° C. | ISO 180/1A (2000) | kJ/m$^2$ | 39.63 | 34.31 | 34.70 | 30.82 | 16.66 | 38.22 |
| Izod at 0° C. | ISO 180/1A (2000) | kJ/m$^2$ | 10.06 | 8.58 | 8.88 | 8.28 | 7.37 | 9.95 |
| Izod at −30° C. | ISO 180/1A (2000) | kJ/m$^2$ | 5.37 | 4.50 | 4.21 | 4.28 | 4.20 | 4.71 |
| Flexural Modulus | ISO 178 A (2010) | MPa | 1414 | 1426 | 1437 | 1442 | 1505 | 1329 |
| Gloss Value at 20° | ISO 2813 (2014) | GU | 16.6 | 29.0 | 22.2 | 36.0 | 6.6 | 33.9 |
| Gloss Value at 60° | ISO 2813 (2014) | GU | 34.4 | 49.8 | 42.4 | 54.7 | 20.3 | 59.7 |
| Scratch visibility | — | — | Pass | Pass | Pass | Pass | Fail | Pass |

The impact resistance was measured as Izod impact strength in accordance with ISO 180 of 2000, using method A. The impact resistance was measured at temperatures of 23° C., 0° C., and −30° C.

The flexural modulus was measured in accordance with ISO 178 of 2010, method A.

The gloss value was measured in accordance with ISO 2813 of 2014, at measuring angles of 20° and 60°. The gloss value is expressed in terms of gloss units (GU).

The scratch resistance is determined as the scratch visibility. Test specimens plaques were prepared from the compositions of examples 1-3 and comparative examples 4-6 via injection moulding. Subsequent to injection moulding, the test specimens were conditioned for 72 hours at a temperature of 23° C. and 50% relative humidity.

The specimens were subjected to scratching in an Erichsen 430P scratch hardness tester. The scratch hardness tester was set at a constant displacement speed of 1000 mm/min, using a scratch probe having a ball shaped tip with a ball diameter of 1.0 mm, of the type Erichsen Hardness Test Pencil 318, geometry no. 2. The scratch hardness tester was set to scratch the specimen surface with a load of 15 N. The specimens were scratched in a grid having length and width of 40 mm, with a grid spacing of 2 mm. Subsequent to scratching, the test specimens were conditioned for 72 hours at a temperature of 23° C. and 50% relative humidity.

The scratch visibility was determined via measurement of color difference dL in accordance with ASTM D6290 (2005) and ASTM E308 (2013). ASTM D6290 (2005) relates to color determination of plastic pellets. ASTM E308 (2013) relates to the computing of colors of objects using the CIE system. A measurement is marked 'Pass' if the value for dL≤1.5; if dL values are ≥1.5, the measurement is marked 'Fail'.

From the results presented in table 2, it becomes apparent that compositions according to the present invention, comprising a heterophasic polypropylene copolymer and an ethylene polymer having a multimodal molecular weight distribution, a density of at least 925 kg/m$^2$, preferably at least ≥940 kg/m$^3$ and a strain hardening modulus of ≥5 MPa, provide a low surface gloss, wherein at least one of impact strength, scratch resistance and/or flexural modulus is improved.

The invention claimed is:

1. Composition comprising a heterophasic propylene copolymer and an ethylene polymer wherein the ethylene polymer has a density as measured according to ISO 1183-1 (2012), method A of ≥940 kg/m$^3$, the ethylene polymer has a multimodal molecular weight distribution and the ethylene polymer has a strain hardening modulus of ≥5.0 MPa, the strain hardening modulus being measured according to ISO DIS 18488 (2014) using test specimens of 0.30 mm thickness.

2. Composition according to claim 1, wherein the heterophasic propylene copolymer has a xylene soluble fraction as determined according to ISO 16152 (2005) of ≥5.0% and ≤27.0% by weight compared to the total weight of the heterophasic propylene copolymer.

3. Composition according to claim 1, wherein the xylene soluble fraction of the heterophasic propylene copolymer as obtained according to the method described in ISO 16152 (2005) has an intrinsic viscosity as determined according to ISO 1628-3 (2010) of at least 200 ml/g.

4. Composition according to claim 1, wherein the composition comprises one or more inorganic fillers in an amount of ≥2.0 and ≤20.0% by weight compared to the total weight of the composition.

5. Composition according to claim 4, wherein the one or more inorganic fillers is selected from the group of talcs.

6. Composition according to claim 5, wherein the median Stokes equivalent spherical diameter of the talc particles is ≤1.0 μm as determined according to ISO 13317-3 (2001).

7. Composition according to claim 1, wherein the composition further comprises a thermoplastic elastomer.

8. Composition according to claim 7, wherein the thermoplastic elastomer is present in an amount of ≥2.0 and ≤20.0% by weight compared to the total weight of the composition.

9. Composition according to claim 7, wherein the thermoplastic elastomer comprises a thermoplastic polyolefin elastomer.

10. Composition according to claim 1, wherein the ethylene polymer has a molecular weight distribution as determined according to ASTM D-6474 (2012) of ≥10 and ≤40.

11. Composition according to claim 1, wherein the composition has:
an Izod impact strength measured according to ISO 180/A (2000) at a temperature of 0° C. of ≥8.5 kJ/m$^2$;
an Izod impact strength measured according to ISO 180/A (2000) at a temperature of −30° C. of ≥4.0 kJ/m$^2$;
an Izod impact strength measured according to ISO 180/A (2000) at a temperature of 23° C. of ≥30.0 kJ/m$^2$; and
a gloss value as measured according to ISO 2813 (2014) at an angle of 20° of ≤30.0 GU.

12. Composition according to claim 1, wherein the flexural modulus as measured according to ISO 178 (2010) method A is ≥1400 MPa.

13. An automotive interior part comprising the composition of claim 1.

14. Article, comprising a composition according to claim 1.

15. Automotive interior part comprising a composition having:
a flexural modulus as measured according to ISO 178 (2010) method A of ≥1700 MPa;
an Izod impact strength measured according to ISO 180/A (2000) at a temperature of 23° C. of ≥45.0 kJ/m$^2$;
an Izod impact strength measured according to ISO 180/A (2000) at a temperature of −30° C. of ≥6.0 kJ/m$^2$;
a fraction of samples showing an impact failure in one of the categories YD or YS upon puncture impact testing according to ISO 6603-2 (2000) at 23° C. of ≥98%; and
a fraction of samples showing an impact failure in one of the categories YD or YS upon puncture impact testing according to ISO 6603-2 (2000) at −30° C. of ≥80%.

16. Composition according to claim 1, wherein the composition has a gloss value of ≤30.0 GU as measured according to ISO 2813 (2014) at an angle of 20°.

17. Composition according to claim 1, wherein the ethylene polymer has a density as measured according to ISO 1183-1 (2012), method A of ≤945 kg/m$^3$.

* * * * *